US 11,182,210 B2

(12) United States Patent
Cheng

(10) Patent No.: US 11,182,210 B2
(45) Date of Patent: Nov. 23, 2021

(54) METHOD FOR RESOURCE ALLOCATION AND TERMINAL DEVICE

(71) Applicant: Guangdong Oppo Mobile Telecommunications Corp., Ltd., Guangdong (CN)

(72) Inventor: Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 222 days.

(21) Appl. No.: 16/046,460

(22) Filed: Jul. 26, 2018

(65) Prior Publication Data

US 2019/0034234 A1    Jan. 31, 2019

(30) Foreign Application Priority Data

Jul. 31, 2017  (CN) .......................... 201710640040.6
Jul. 31, 2017  (CN) .......................... 201710641499.8
Jul. 31, 2017  (CN) .......................... 201710643680.2

(51) Int. Cl.
*G06F 9/50*  (2006.01)

(52) U.S. Cl.
CPC .............. *G06F 9/50* (2013.01); *G06F 9/5011* (2013.01); *G06F 9/5027* (2013.01); *G06F 2209/501* (2013.01)

(58) Field of Classification Search
None
See application file for complete search history.

(56) References Cited

U.S. PATENT DOCUMENTS

| 2006/0168582 A1 | 7/2006 | Muller et al. |
| 2009/0293051 A1* | 11/2009 | Krywaniuk ............... G06F 8/63 717/173 |
| 2012/0079497 A1 | 3/2012 | Gangemi et al. |
| 2012/0159259 A1 | 6/2012 | Klein et al. |

(Continued)

FOREIGN PATENT DOCUMENTS

| CN | 102594675 A | 7/2012 |
| CN | 103049245 A | 4/2013 |

(Continued)

OTHER PUBLICATIONS

International search report issued in corresponding international application No. PCT/CN2018/097484 dated Oct. 18, 2018.

(Continued)

*Primary Examiner* — Wynuel S Aquino
(74) *Attorney, Agent, or Firm* — Young Basile Hanlon & MacFarlane, P.C.

(57) ABSTRACT

A method for resource allocation and a terminal device are provided. The method includes the following operations. A management module of an operating system receives a scenario data package from a target application that is currently running, where the scenario data package contains a scenario associated information of the target application. A strategy module of the operating system determines a performance improvement strategy for the target application according to the scenario data package. The operating system adjusts allocation of system resources for the target application according to the performance improvement strategy.

10 Claims, 8 Drawing Sheets

(56) References Cited

U.S. PATENT DOCUMENTS

| | | | |
|---|---|---|---|
| 2015/0317189 A1 | 11/2015 | Georgescu et al. | |
| 2016/0154639 A1* | 6/2016 | Clark | G06F 8/443 718/104 |
| 2017/0046179 A1* | 2/2017 | Teh | G06F 9/44505 |
| 2017/0262304 A1* | 9/2017 | Williams | G06F 11/3466 |
| 2018/0004869 A1* | 1/2018 | Asahara | G06N 7/005 |
| 2018/0130171 A1 | 5/2018 | Prakash et al. | |
| 2018/0276047 A1* | 9/2018 | Lo | G06F 9/5011 |
| 2018/0299940 A1* | 10/2018 | Wang | G06F 15/76 |
| 2018/0343318 A1* | 11/2018 | Yuan | H04M 1/72522 |

FOREIGN PATENT DOCUMENTS

| | | | |
|---|---|---|---|
| CN | 103430151 A | 12/2013 | |
| CN | 103685412 A | 3/2014 | |
| CN | 103699432 A | 4/2014 | |
| CN | 104991775 A | 10/2015 | |
| CN | 105159781 A | 12/2015 | |
| CN | 105183560 A | 12/2015 | |
| CN | 106020987 A | 10/2016 | |
| CN | 106095592 A | 11/2016 | |
| CN | 106201890 A | 12/2016 | |
| CN | 106549880 A | 3/2017 | |
| CN | 106874168 A | 6/2017 | |
| CN | 107450988 A | 12/2017 | |
| CN | 107483725 A | 12/2017 | |
| CN | 107517306 A | 12/2017 | |
| CN | 107528976 A | 12/2017 | |
| CN | 107577537 A | 1/2018 | |
| KR | 100838526 B1 | 6/2008 | |
| WO | 2015172367 A1 | 11/2015 | |

OTHER PUBLICATIONS

Extended European search report issued in corresponding European application No. 18186160.0 dated Jan. 7, 2019.
First office action with English translation issued in corresponding CN application No. 201710641499.8 dated Apr. 22, 2019.
Second office action with English translation issued in corresponding CN application No. 201710641499.8 dated Jul. 25, 2019.
Third office action with English translation issued in corresponding CN application No. 201710641499.8 dated Nov. 26, 2019.
First office action English translation issued in corresponding CN application No. 201710643680.2 dated Apr. 22, 2019.
Second office action with English translation issued in corresponding CN application No. 201710643680.2 dated Jul. 25, 2019.
Third office action with English translation issued in corresponding CN application No. 201710643680.2 dated Nov. 4, 2019.
Rejection with English translation issued in corresponding CN application No. 201710641499.8 dated Mar. 24, 2020.
Examination report issued in corresponding IN application No. 201834028441 dated Jul. 16, 2020.
First office action with English translation issued in corresponding CN application No. 201710640040.6 dated Apr. 19, 2019.
Communication pursuant to Article 94(3) EPC issued in corresponding European application No. 18186160.0 dated Jan. 27, 2020.
Rejection with English translation issued in corresponding CN application No. 201710643680.2 dated Mar. 3, 2020.
Examination report and English Translation issued in corresponding IN application No. 201834028440 dated Jul. 20, 2020.
Non final rejection issued in corresponding U.S. Appl. No. 16/049,081 dated Jun. 1, 2020.
International search report issued in corresponding international application No. PCT/CN2018/097514 dated Oct. 26, 2018.
Extended European search report issued in corresponding European application No. 18186162.6 dated Jan. 7, 2019.
Communication pursuant to Article 94(3) EPC issued in corresponding European application No. 18186162.6 dated Jan. 29, 2020.
Final rejection issued in corresponding U.S. Appl. No. 16/049,081 dated Dec. 7, 2020.
Summons to attend oral proceedings pursuant to Rule 115(1) EPC for EP Application 18186160.0 mailed Apr. 26, 2021. (10 pages).
Summons to attend oral proceedings pursuant to Rule 115(1) EPC to EP Application 18186162.6 mailed Apr. 26, 2021. (12 pages).

* cited by examiner

METHOD FOR RESOURCE ALLOCATION AND TERMINAL DEVICE

CROSS-REFERENCE TO RELATED APPLICATION(S)

This application claims priorities to Chinese Application No. 201710640040.6, filed on Jul. 31, 2017, Chinese Application No. 201710643680.2, filed on Jul. 31, 2017, and Chinese Application No. 201710641499.8, filed on Jul. 31, 2017, the contents of all of which are hereby incorporated by reference in their entireties.

TECHNICAL FIELD

This disclosure relates to the technical field of terminal devices, and particularly to a method for resource allocation and a terminal device.

BACKGROUND

With the rapid development of technologies relating to terminal devices, an increasing number of applications are installed on mobile phones of users, such as reading APPs, payment APPs, game APPs, and music APPs. People's daily life is closely linked with the mobile phones.

SUMMARY

Implementations of the present disclosure provide a method for resource allocation and terminal device.

According to a first aspect of the disclosure, a method for resource allocation is provided. The method includes the following operations. A management module of an operating system receives a scenario data package from a target application that is currently running, where the scenario data package contains scenario associated information of the target application. A strategy module of the operating system determines performance improvement strategy for the target application according to the scenario data package. The operating system adjusts allocation of system resources for the target application according to the performance improvement strategy.

According to a second aspect of the disclosure, a terminal device is provided. The terminal device includes at least one processor and a computer readable storage medium. The computer readable storage is coupled to the at least one processor and stores at least one computer executable instruction thereon which, when executed by the at least one processor, cause the at least one processor to carry out actions of the method for resource allocation described herein.

According to a third aspect of the disclosure, a non-transitory computer readable storage medium is provided. The non-transitory computer readable storage medium stores at least one computer executable instruction thereon, which, when executed by a data-processing apparatus, adapted to perform actions includes the follows. An operating system receives a scenario data package from a target application that is currently running. The operating system determines a performance improvement strategy for the target application according to the scenario associated information. The operating system adjusts allocation of system resources for the target application according to the performance improvement strategy.

BRIEF DESCRIPTION OF THE DRAWINGS

The following briefly introduces the accompanying drawings required for describing the implementations.

DETAILED DESCRIPTION

Technical solutions of the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first" and "second" used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally further include other steps or units that are not listed; alternatively, other steps or units inherent to the process, method, product, or device can be included either.

The term "embodiment" or "implementation" referred to herein means that a particular feature, structure, or characteristic described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

The terminal device involved in the implementations of the present disclosure may include various handheld devices, on-board devices, wearable devices, computing devices that have wireless communication functions, or other processing devices connected to the wireless modem, as well as various forms of user equipment (UE), mobile stations (MSs), terminal devices, and the like. For the convenience of description, the above-mentioned devices are collectively referred to as a terminal device. An operating system related to the implementations of the disclosure is a software system that manages hardware resources uniformly and provides a user with a service interface. The operating system may be installed or stored in a storing region such as a memory.

Figure 1A:
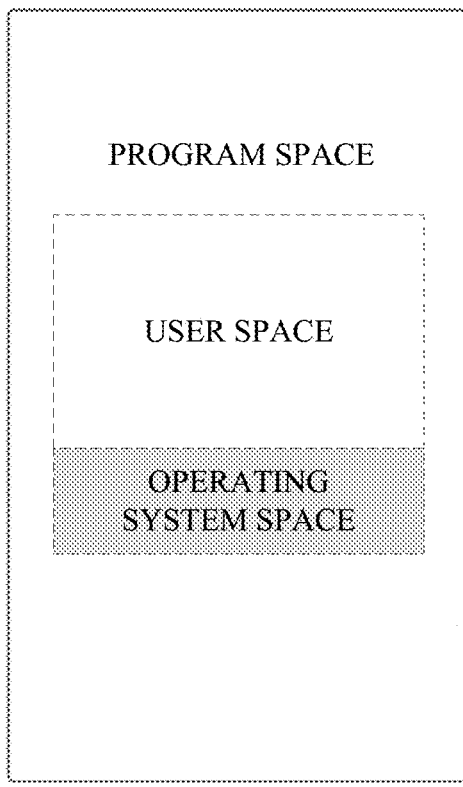
FIG. 1A is a schematic diagram illustrating a program space of a smart phone.
Figure 1B:
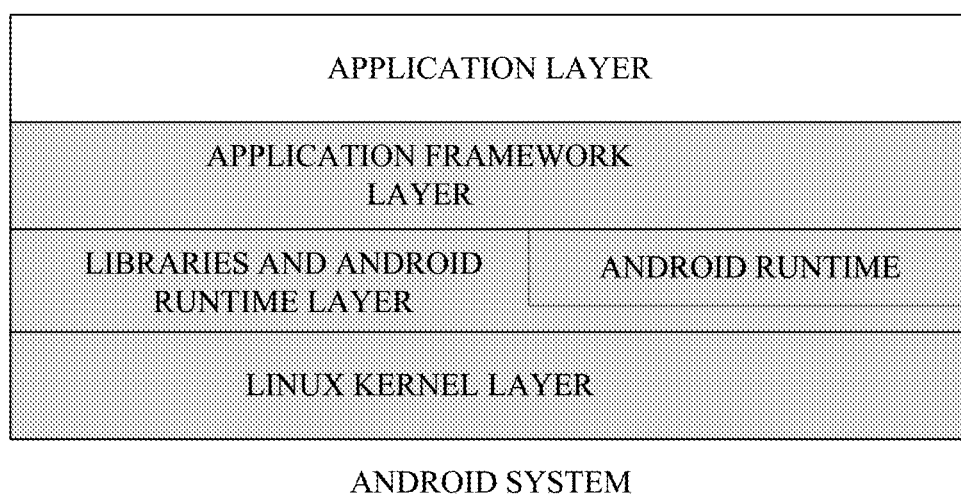
FIG. 1B is a schematic diagram illustrating a system architecture of an Android™ system.

As illustrated in FIG. 1A, a terminal device such as a smart phone generally has a program space for running programs. The program space includes a user space and an operating system space (that is, a place to install the operating system). At least one application, which is a third-party application installed on the terminal device, can run in the user space. An operating system of the terminal device runs in the operating system space. Examples of the operating system include but are not limited to an Android® system and an iPhone operating system (iOS®) that is a mobile operating system developed by Apple. As illustrated in FIG. 1B, the following describes the Android system runs in the terminal device as an example. In the case of Android system, the user space includes an application layer of the Android system. The operating system space includes an application framework layer, Libraries and Android RunTime layer, and a Linux kernel layer of the Android system. The application layer includes various applications directly interacting with a user or service programs written in the Java language and running in the background, for example, programs for implementing common basic functions on smart phones, such as short messaging service (SMS), telephone dialing, picture viewers, calendars, games, maps, world wide web (Web) browsers and so on, as well as other applications developed by developers. The application framework layer provides a series of libraries necessary for developing Android applications, which can be used to reuse components and achieve personalize extensions through inheritance. The Libraries and Android RunTime layer can support the application framework and provide services for various components in the Android system. The Libraries and Android RunTime layer includes Libraries and Android RunTime. The Android RunTime includes a core library and a Dalvik virtual machine. The Linux kernel layer is configured to implement core functions such as hardware device driving, process and memory management, network protocol stacks, power management, and wireless communications.

A process created by the third-party application runs in the user space at first. When the third-party application needs to execute actions of sending data through the network and reading disk resources, standard interface functions, such as "write" or "send" interface functions, provided by the operating system should be invoked; that is request operations of a user can be achieved by the central processing unit (CPU) invoking codes of the operating system space. Therefore, a third-party application can only invoke the standard interface functions provided by the operating system to achieve functions provided by the operating system. On the other hand, the operating system has no idea about what functions the third-party application is executing, the target application also cannot instruct the operating system to execute special operations, it can be seen that the operating system and the target application are independent from each other. Therefore, the operating system cannot distinguish an internal running scenario of the target application and can only use a set of standard parameters for adapting, so that the targeted performance optimization for the internal running scenario of the target application cannot be achieved.

In view of the above, implementations of the present application provide a method for system resource allocation for a target application of a terminal device.

Figure 2:
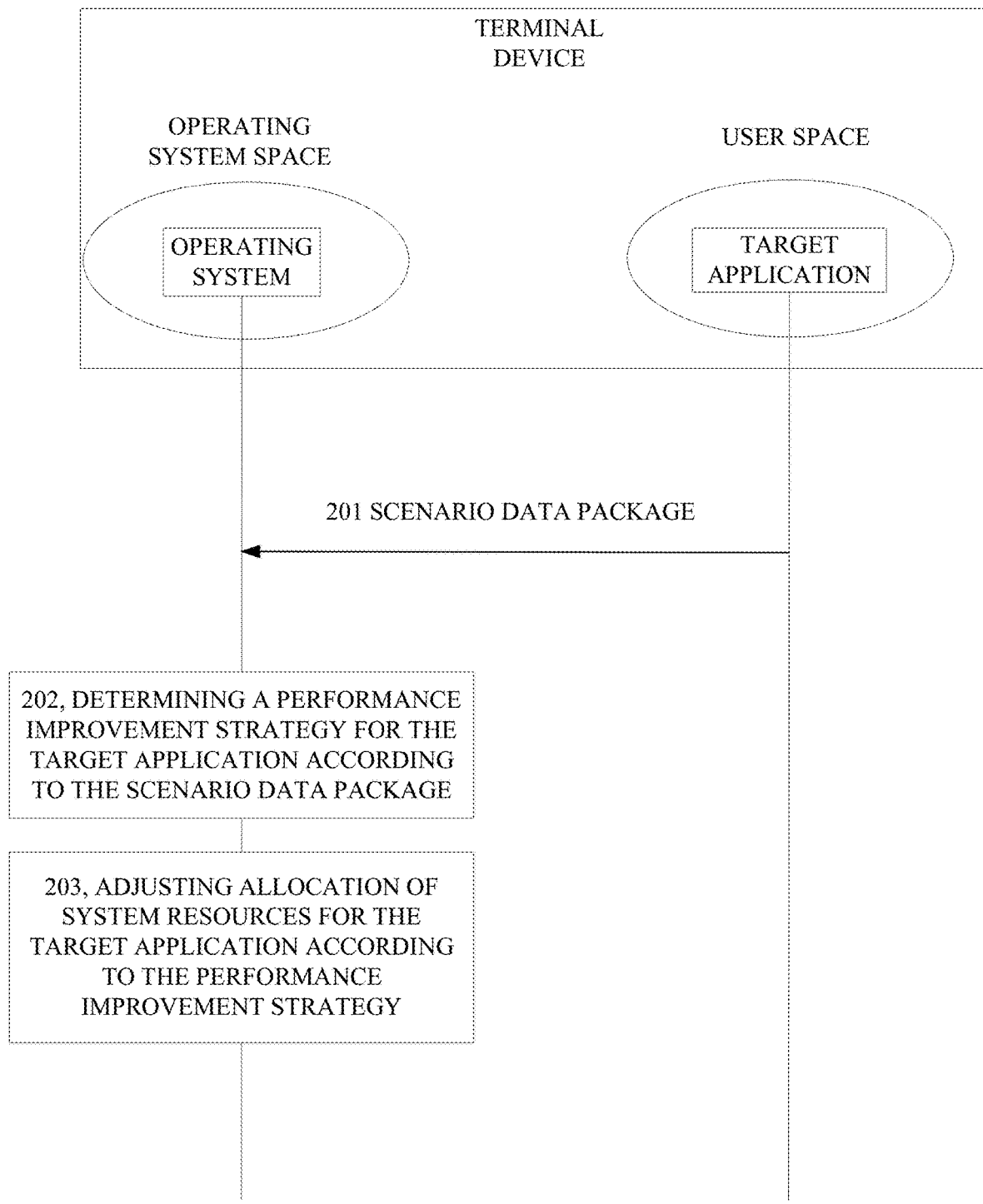
FIG. 2 is a schematic flow chart illustrating a method for resource allocation according to an implementation of the present application.

FIG. 2 illustrates a method for system resource allocation based on a general concept of the disclosure. As illustrated in FIG. 2, an operating system running in an operating system space receives, from a user space, a scenario data package of a target application at block 201 and determines a performance improvement strategy for the target application at block 202, then the operating system can adjust allocation of system resources for the target application according to the performance improvement strategy determined.

The operating system may include a management module and at least one strategy module. The management module is configured to communicate with applications installed on the terminal device. The management module has access to the plurality of strategy modules. The strategy module referred to herein can be understood as a database for storing strategy information. Specifically, each strategy module is configured to store at least one performance improvement strategy associated with one class of applications. That is, the strategy modules are adapted for different types of target applications. On the other hand, the strategy module is not merely a database; it also has self-decision and management function. Based on the number of strategy modules included in the operating system, the system resource allocation adjusting method can be implemented in different manners.

In one method for system resource allocation, a management module of an operating system receives a scenario data package from a target application that is currently running, where the scenario data package contains scenario associated information of the target application. A strategy module of the operating system determines performance improvement strategy for the target application according to the scenario data package. The operating system adjusts allocation of system resources for the target application according to the performance improvement strategy.

As mentioned above, the operating system may have one or more than one strategy module, in case more than one strategy module is provided, the strategy module for determining the performance improvement strategy will be determined first, for example, according to an application type identifier included in the scenario data package, which will be detailed below.

In another method for system resource allocation, a management module of an operating system of the terminal device receives a scenario data package from a target application that is currently running, where the scenario data package contains scenario associated information of the target application and an application type identifier of the target application. The management module determines, from among the plurality of strategy modules, a strategy module corresponding to the application type identifier. The strategy module of the operating system determines a performance improvement strategy for the target application that is currently running according to the scenario associated information. Thereafter the operating system adjusts allocation of system resources for the target application according to the performance improvement strategy.

In this way, it is possible to improve the real-time performance and accuracy of the performance optimization of the target application which is conducted under control of the terminal device. The following describes the implementations of the present application with reference to the accompanying drawings.

Multi-Strategy Modules

Figure 3:
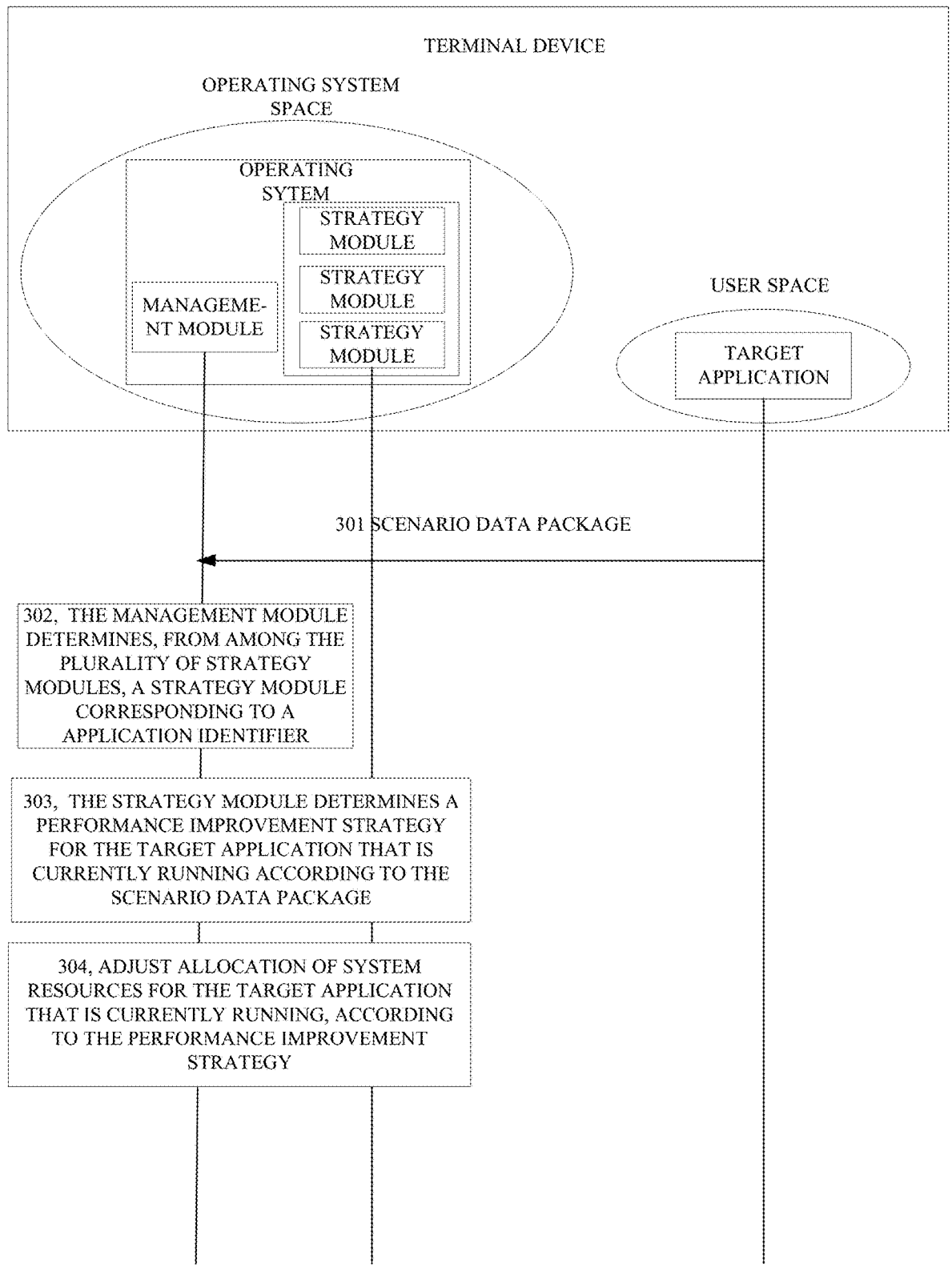
FIG. 3 is a schematic flow chart illustrating a method for resource allocation according to another implementation of the present application.

Referring to FIG. 3, FIG. 3 is a schematic flow chat illustrating a method for resource allocation according to an implementation of the disclosure. The operating system for implementing the method has a management module and multiple strategy modules. The plurality of strategy modules can implement fine control for different types of applications. As illustrated in FIG. 3, The method starts at block 301.

At block 301, the management module receives a scenario data package from a target application that is currently running, where the scenario data package contains a scenario associated information of the target application and application type identifier of the target application. The application type identifier can be used to identify a type of one or more applications.

The target application refers to a third-party application installed in a user space of the terminal device. The third-party application may be an Instant Messenger App or a game App for example. The third-party application may be installed by a user or pre-installed by developers before the terminal device leaves the factory. The disclosure is not limited thereto. Each class of applications may have one identifier set in advance to be distinguished from other classes of applications.

The scenario data package is a generic term for data related to a specific scenario of an application. The scenario data package contains scenario associated information of an internal running scenario of the running target application. The scenario associated information, as the name suggests, refers to information of a scenario and may include scenario identifier, performance parameters, and the like. The internal running scenario can be classified according to different preset conditions. For example, the internal running scenario can be classified into an interactive scenario and a non-interactive scenario according to whether there is user interaction. Alternatively, the internal running scenario can be classified into a single-user scenario and a multi-user scenario according to the complexity of the task. Alternatively, the internal running scenario can be classified into a scenario of switching on the terminal device, a resource updating scenario, an account logging scenario, a mall scenario, and a main interface scenario according to different behaviors of a user using the terminal device. The preset conditions can also be associated with different application types. That is, applications of different types can provide the same running scenario or different running scenarios according to the preset condition. The disclosure is not limited thereto.

The scenario associated information can include at least one kind of information associated with the current internal running scenario of the target application. The at least one kind of information includes a scenario identifier and key performance parameters. The scenario identifier may be determined through key information collected of the current internal running scenario. The key information can include information of switching on the terminal device, resource updating information, account logging information, and interface type information. The key performance parameters can include a frame rate, frame loss, and stuck of the current internal running scenario, which are not limited herein. In addition, a format of the scenario data package may be, for example, a JavaScript object notation (JSON), a protocol buffer (Protobuf), and a custom format, which is not limited herein.

In one implementation, a preset data channel is established between the target application and the operating system. The management module receives the scenario data package from the target application that is currently running as follows. The management module receives the scenario data package from the target application that is currently running, through the preset data channel.

The preset data channel may be an effective data transmission link established between the target application and the operating system when the target application is running. When the target application is no longer running, the data transmission link will be cleared.

In one implementation, the target application includes a data connection module. The operating system includes a data connection management module. Based on such configuration, the above-mentioned method further includes the following. The data connection module and the data connection management module establish the preset data channel.

In one possible implementation, the target application further includes a data collecting module, a data sorting module, a priority management module, and a data receiving module. The data collecting module is configured to collect key information regarding a running target application. The data sorting module is configured to sort the key information collected, such as merging duplicate information and deleting redundant information. The priority management module is configured to classify the key information collected according to the importance of key information. The priority management module is configured to deal with key information with higher priority first and to filter key information with lower priority or make the key information with lower priority less used in a generation process of a data package. The data receiving module is configured to receive and parse data from a system application of the operating system, and send the data parsed to an interior of the target application.

At block 302, the management module determines, from among the plurality of strategy modules, a strategy module corresponding to the application type identifier.

In one implementation, as mentioned above, each of the plurality of strategy modules may be adapted to the same type application. For example, a first strategy module can be adapted to a game App and a second strategy module may be adapted to an Instant Messenger App.

In one implementation, the management module determines, from among the plurality of strategy modules, the strategy module corresponding to the application type identifier in the following manner. The management module determines the strategy module corresponding to the application type identifier of the scenario data package by querying a mapping relation between preset strategy modules and application type identifiers via using the application type identifier as a query identifier.

At block 303, the strategy module determines a performance improvement strategy for the target application according to the scenario data package, specifically, the scenario associated information of the target application.

In one implementation, the performance improvement strategy refers to a resource allocation strategy configured to improve running performance of the target application that is currently running. For example, the resource allocation strategy can be a CPU resource adjustment strategy, a graphic processing unit (GPU) resource adjustment strategy, a memory bandwidth resource adjustment strategy, a disk resource adjustment strategy, a network resource adjustment strategy, and so on. The disclosure is not limited herein.

At block 304, the operating system adjusts allocation of system resources for the target application according to the performance improvement strategy. Resource allocation can be performed a component other than the management module and the strategy modules of the operating system.

In one implementation, the system resources include at least one kind of resources of the terminal device: CPU resources, GPU resources, memory bandwidth resources, disk resources, and network resources. The network resources include network resources of a data network of the terminal device, network resources of a wireless fidelity (Wi-Fi) network, and control parameter resources of a Bluetooth module. Resource allocation, for example, may refer to resource occupation rate of resources.

When the system resources are at least one of the CPU resources, the GPU resources, the memory bandwidth resources, and the disk resources, the operating system communicate with a kernel layer of the operating system space via direct communication, so as to adjust the allocation of the system resources. The direct communication refers to communicating directly through an abstract Application programming Interface (API).

For example, the system resources are network resources. In this situation, the operating system can adjust allocation of the system resources via indirect communication with the kernel layer of the operating system space. The indirect communication is conducted by invoking proxy services. For example, a Wi-Fi subsystem or a data network subsystem in the network resources does not run in the same system as the operating system, in this situation, the system resources can be accessed indirectly through some proxy manners. Further, the operating system provides a proxy service for the Wi-Fi subsystem to indirectly communicate with the Wi-Fi subsystem by invoking an interface of the proxy service.

Single-Strategy Module

Figure 4:
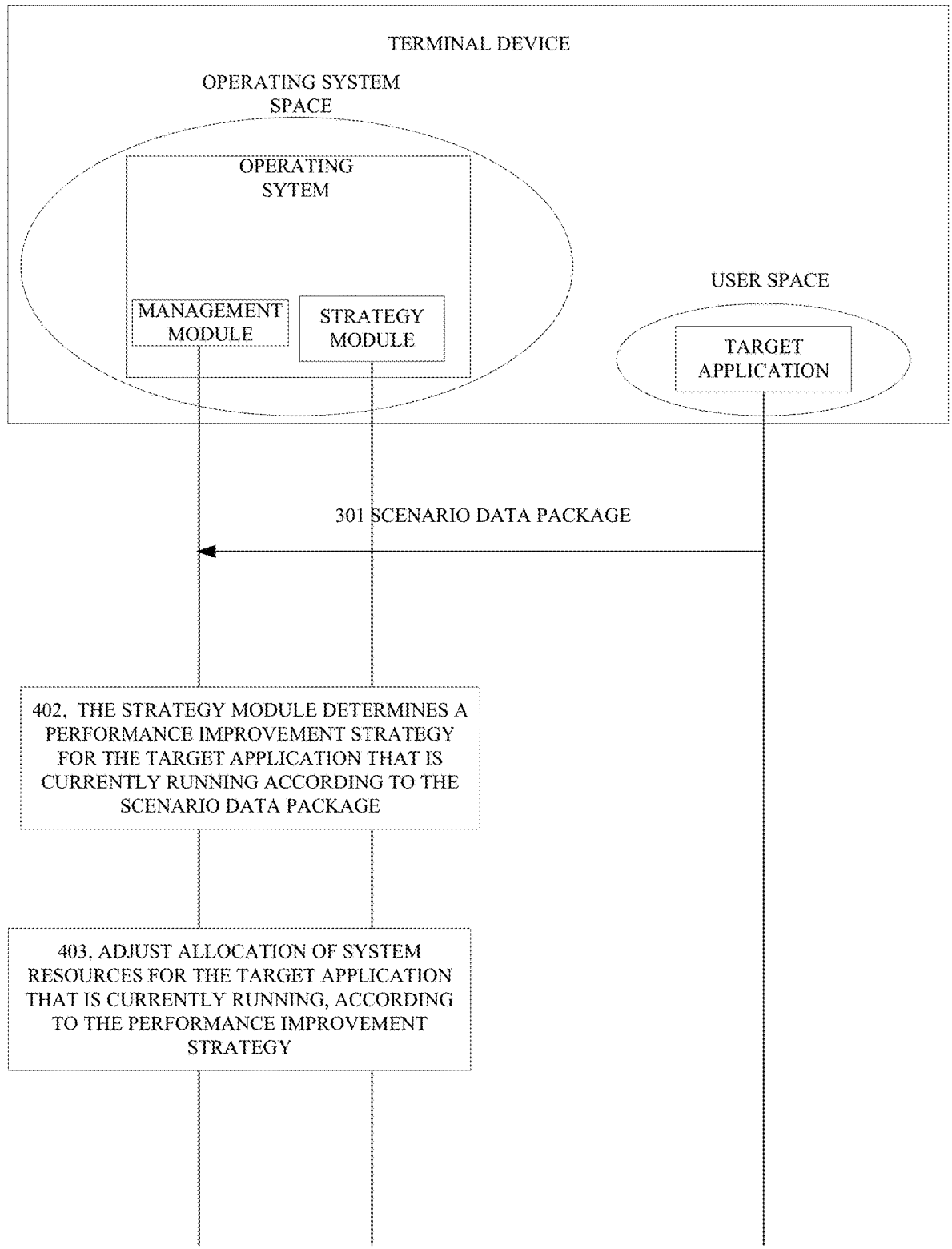
FIG. 4 is a schematic flow chart illustrating a method for resource allocation according to another implementation of the present application.

Referring to FIG. 4, FIG. 4 is a schematic flow chat illustrating a method for resource allocation according to an implementation of the disclosure. The method described with reference to FIG. 4 below differs from that of FIG. 3 in that, the operating system for implementing the method has a management module and one strategy module. Based on this, there is no need for the scenario data package to contain any application type identifier for determining a specific strategy module since only one strategy module is available. Therefore, once the management module receives a scenario data package, the strategy module can determine a performance improvement strategy for the target application according to the scenario data package, which will be detailed below. As illustrated in FIG. 4, the method begins at block 401.

At block 401, the management module receives a scenario data package from a target application that is currently running, where the scenario data package contains scenario associated information of the target application.

At block 402, the strategy module determines a performance improvement strategy for the target application according to the scenario data package, specifically, the scenario associated information of the target application.

At block 403, the operating system adjusts allocation of system resources for the target application according to the performance improvement strategy.

According to the implementations of the disclosure, the operating system of the terminal device receives the scenario data package from the target application that is currently running, where the scenario data package contains the scenario associated information of the target application. Then the operating system invokes the strategy module to determine the performance improvement strategy for the target application that is currently running according to the scenario data package. The operating system adjusts the allocation of the system resources for the target application according to the performance improvement strategy. Since the scenario data package contains scenario associated information of the target application, and the scenario data package is sent by the target application that is currently running, the strategy module of the operating system can precisely determine the performance improvement strategy for the target application that is currently running according to the scenario data package, and the operating system can adjust the allocation of the system resources for the target application in real time according to the performance improvement strategy. Therefore, the real-time performance optimization of the running target application can be realized by the operating system, which is beneficial to improving the real-time performance and accuracy of the performance optimization of the target application which is conducted under control of the terminal device. With aid of the technical solutions of the present disclosure, there is no need for the terminal device to load all strategy modules at the same time, instead, the terminal device only needs to load the strategy module corresponding to the target application running in the foreground of the terminal device, which helps to reduce resource consumption and to improve resource utilization rate and control efficiency.

Besides, since the operating system includes the management module and the strategy module(s), the management module and the strategy module cooperate to confirm the performance improvement strategy of the target application, that is, the process of determining the performance improvement strategy is completed in a modular approach, in which each module implements a corresponding function, and when a single module fails, it will not affect the state of another module, which is beneficial to improve the stability of controlling the target application for running optimization by the terminal device.

In one implementation, as mentioned above, the scenario data package contains scenario associated information of the target application. Based on this, the strategy module determines the performance improvement strategy for the target application according to the scenario data package as follows. The strategy module acquires the scenario associated information of the scenario data package and determines the performance improvement strategy for the target application according to the scenario associated information. As can be seen, since the scenario associated information is associated with the target application that is currently running, it will be beneficial to accurately determining the performance improvement strategy for the target application in the current running scenario and to improve the accuracy of the resource allocation.

The scenario associated information includes at least one of the scenario identifier of the target application and the key performance parameters of the target application.

Implementation 1

In one implementation, the scenario associated information includes the scenario identifier of the target application. In this case, the strategy module determines the performance improvement strategy for the target application according to the scenario associated information as follows. The strategy module determines a performance improvement strategy corresponding to the scenario identifier as the performance improvement strategy for the target application.

The operating system invokes the strategy module to query a mapping relation between preset performance improvement strategies and scenario identifiers by using the scenario identifier as a query identifier, to determine the performance improvement strategy corresponding to the scenario identifier.

Since scenario identifiers and performance improvement strategies are in one-to-one correspondence and the scenario identifier of the scenario data package is associated with a current scenario of the target application that is currently running, that is, the performance improvement strategy determined is associated with a current running state of the target application that is currently running, adjusting of resource allocation according to the performance improvement strategy can accurately optimize the current running state of the target application, which is helpful for improving the accuracy of the terminal device in controlling the target application that is currently running.

Implementation 2

In another implementation, the scenario associated information includes the key performance parameters of the target application. In this case, the strategy module determines the performance improvement strategy for the target application according to the scenario associated information as follows. The strategy module determines the performance improvement strategy for the target application according to the key performance parameters.

The key performance parameters are configured to describe key data indicators for the target application, where the key data may refer to a frame rate, frame loss, and lag for example.

The strategy module determines the performance improvement strategy for the target application according to the key performance parameters as follows. The strategy module determines resources associated with the key performance parameters as system resources to-be-adjusted, determines an adjustment amount of the system resources to-be-adjusted according to the key performance parameters, and determines or generates the performance improvement strategy for the target application according to the adjustment amount. As such, the adjustment amount of the system resources to-be-adjusted can be accurately calculated, which helps to improve the accuracy of the performance improvement strategy.

For example, the key performance parameters of the scenario associated information are X frames per second (X FPS) frame rate; in this situation, the strategy module determines that the system resources to-be-adjusted associated with the frame rate are CPU resources and GPU resources and then determines, according to the frame rate of X FPS, that an adjustment amount of the CPU resources is A and an adjustment amount of the GPU resources is B, thereafter, according to the adjustment amount A and the adjustment amount B, the strategy module generates the performance improvement strategy for the target application, where according to the performance improvement strategy, performance parameters of the CPU resources will be increased by A and performance parameters of the GPU resources will be increased by B.

In another implementation, the strategy module determines the performance improvement strategy for the target application according to the key performance parameters as follows. The strategy module determines parameter types and a parameter numerical range of the key performance parameters, determines a performance improvement strategy package corresponding to the parameter types, and determines, from among the performance improvement strategy package, a performance improvement strategy suitable for the parameter numerical range by using the parameter numerical range as a query identifier. The strategy module can manage a plurality of performance improvement strategy packages corresponding to multiple parameter types. Each performance improvement strategy package contains performance improvement strategies suitable for different parameter numerical ranges. With aid of such setting, there is no need to calculate the adjustment amount of the system resources to-be-adjusted in real time and the adjustment amount may be acquired by querying, which helps to quickly determine the performance improvement strategy.

As can be seen, the target application can send to the operating system the key performance parameters that are impossible for the operating system to collect, so that the operating system can specifically optimize the performance of the target application in the current internal running scenario. That is, a performance improvement strategy can be quickly determined with high-accuracy according to the key performance parameters, so that the allocation of the system resources for the target application that is currently running can be adjusted in real time, which is beneficial to improving the real-time performance and accuracy of the performance optimization of the target application which is conducted under control of the terminal device.

Implementation 3

In another implementation, the scenario associated information includes the scenario identifier and the key performance parameters of the target application. In this case, the strategy module determines the performance improvement strategy for the target application according to the scenario associated information as follows. The strategy module determines the system resources to-be-adjusted corresponding to the scenario identifier and determines the performance improvement strategy for the target application according to the system resources to-be-adjusted and the key performance parameters.

The system resources corresponding to the scenario identifier are system resources in the terminal device, which can affect the running performance of the target application in the current internal running scenario. For example, an internal running scenario of a game App is a "game mall interface" scenario. The scenario identifier of the "game mall interface" scenario is a mall interface. Since the CPU resources and the disk resources of the terminal device affect the operation performance of the "game mall interface" scenario, the system resources corresponding to the mall interface are the CPU resources and the disk resources.

The strategy module determines the performance improvement strategy for the target application according to the system resources to-be-adjusted and the key performance parameters as follows. The strategy module determines the adjustment amount of the system resources to-be-adjusted, according to parameters associated with the system resources to-be-adjusted in the key performance parameters and determines or generates the performance improvement strategy for the target application according to the adjustment amount.

As can be seen, by setting that the system resources to-be-adjusted correspond to the scenario identifier and setting the key performance parameters to be used to determine the adjustment amount of the system resources to-be-adjusted, the performance improvement strategy for the target application in the current internal running scenario can be generated. As such, extra calculation loss caused by redundancy information in the key performance parameters that is not related to the system resources to-be-adjusted can be avoided, which is beneficial to improving the accuracy and efficiency of the allocation of the system resources for the target application that is currently running.

In one implementation, the scenario data package contains a data format identifier. In this case, the strategy module acquires the scenario associated information of the scenario data package as follows.

Manner 1

The management module determines the scenario associated information of the target application by parsing the scenario data package according to a data format indicated by the data format identifier and sends the scenario associated information to the strategy module. It can be seen that, the management module processes the scenario data package in a unified manner and what the strategy module needs to do is receiving from management module the processing result, that is, the scenario associated information. With aid of such setting, functions of the strategy module can be optimized and refined, which facilitates maintenance, addition, and other operations performed on the strategy module, therefore improving system stability.

Manner 2

Alternatively, the management module sends the scenario data package to the strategy module and the strategy module determines the scenario associated information of the target application by parsing the scenario data package according to the data format indicated by the data format identifier. After sending the scenario data package to the strategy module, the management module can enter a dormant state to save power. It can be seen that the management module just sends the scenario data package to the strategy module for processing. Therefore, the management module can quickly enter a dormant state after sending the scenario data package to the strategy module, and there is no need for the management module to be continuously enabled, which is beneficial to reducing the overall power consumption of the operating system and improving the efficiency.

Manner 3

Alternatively, the management module determines a first data format associated with the strategy module, converts a second data format of the scenario data package into the first data format when the second data format is different from the first data format, and sends to the strategy module the scenario data package converted. Then the strategy module determines the scenario associated information of the target application, by parsing the scenario data package converted according to the first data format. Thus, the management module can convert the scenario data package that the strategy module cannot recognize into a scenario data package that the strategy module is able to recognize and send the scenario data package converted to the strategy module for processing. As a result, the situation that the scenario associated information cannot be accurately determined due to a difference in formats can be avoided, which is beneficial to improving the success rate of resource allocation for the target application that is currently running.

Figure 5:
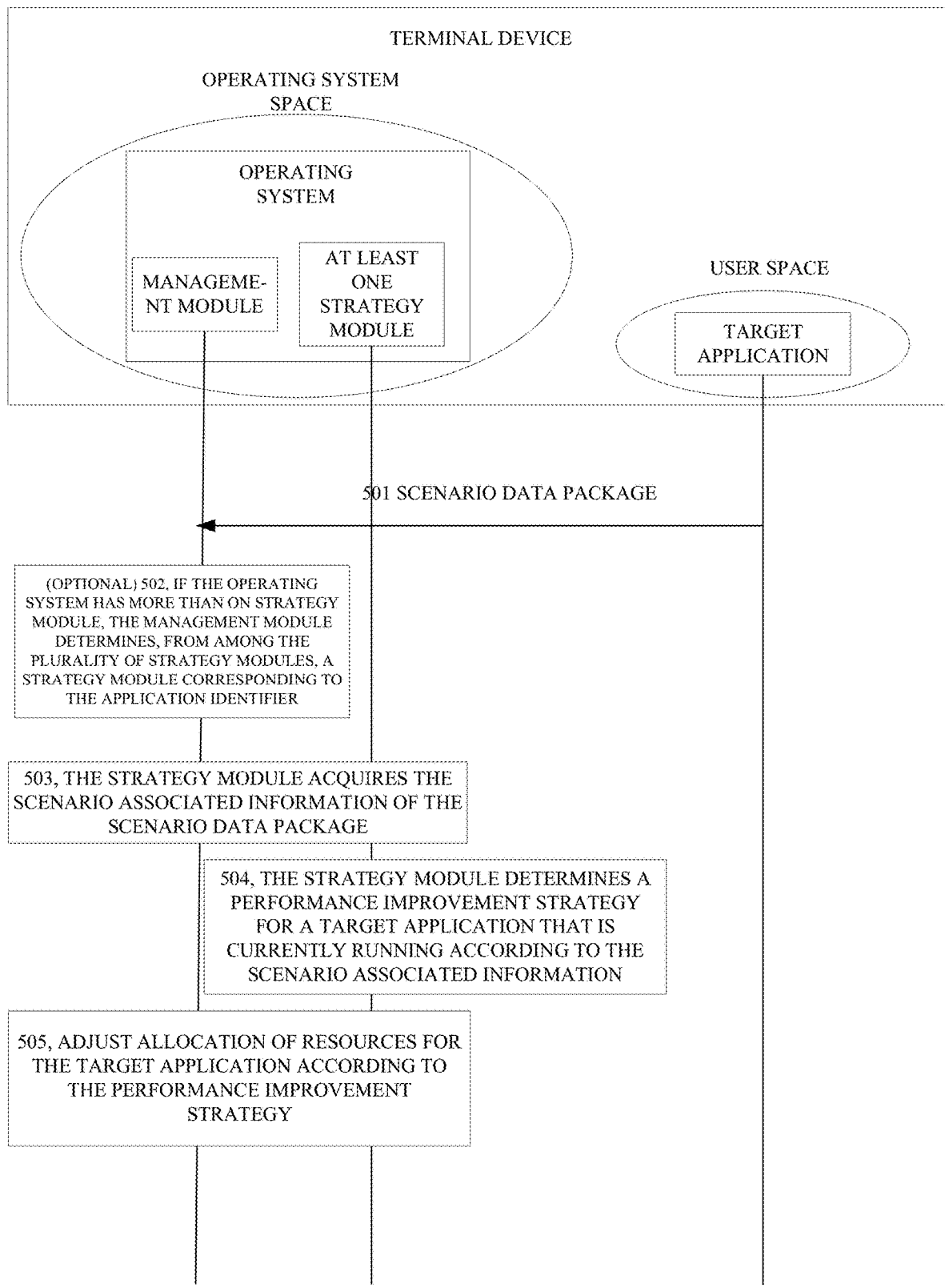
FIG. 5 is a schematic flow chart illustrating a method for resource allocation according to still another implementation of the present application.

FIG. 5 is a schematic flow chart illustrating a method for resource allocation according to an implementation of the present application. The method is applicable to a terminal device with a target application and an operating system. The target application runs in a user space of the terminal device. The operating system runs in an operating system space of the terminal device. The operating system includes a management module and a plurality of strategy modules. The method starts at block 501.

At block 501, the management module receives a scenario data package from the target application that is currently running, where the scenario data package contains scenario associated information of the target application. The scenario data package may further contain an application type identifier of the target application.

At block 502, the management module determines, from among the plurality of strategy modules, a strategy module corresponding to the application type identifier. In case of only one strategy module arranged in the operating system, operations at block 402 will be skipped and the method will proceed to operations at block 403 directly after the scenario data package is received at block 401.

At block 503, the strategy module acquires scenario associated information from the scenario data package.

At block 504, the strategy module determines a performance improvement strategy for the target application according to the scenario associated information.

At block 505, the operating system adjusts allocation of system resources for the target application according to the performance improvement strategy.

According to the implementation of the disclosure, the management module of the terminal device receives the scenario data package from the target application that is currently running, where the scenario data package contains the scenario associated information of the target application. Then the operating system invokes the management module to determine, from among the plurality of strategy modules, the strategy module corresponding to the application type identifier if the operating system is provided with more than one strategy module. The operating system invokes the strategy module to determine the performance improvement strategy for the target application that is currently running according to the scenario associated information of the scenario data package acquired. The operating system adjusts the allocation of the system resources for the target application according to the performance improvement strategy. Since the scenario data package is sent by the target application that is currently running, the strategy module of the operating system can accurately determine the performance improvement strategy for the target application that is currently running according to the scenario data package and the operating system can adjust the allocation of the system resources for the target application in real time according to the performance improvement strategy. Therefore, the performance optimization of the running target application can be achieved by the operating system in real time, which is helpful for improving the real-time performance and accuracy of the performance optimization of the target application which is conducted under control of the terminal device. With aid of the technical solutions of the present disclosure, there is no need for the terminal device to load all strategy modules at the same time, instead, the terminal device only needs to load the strategy module corresponding to the target application running in the foreground of the terminal device, which helps to reduce resource consumption and to improve resource utilization rate and control efficiency.

In addition, the scenario associated information is associated with the target application that is currently running, which is beneficial to accurately determining the performance improvement strategy for the target application in the current running scenario and improving the accuracy of the resource allocation.

Figure 6:
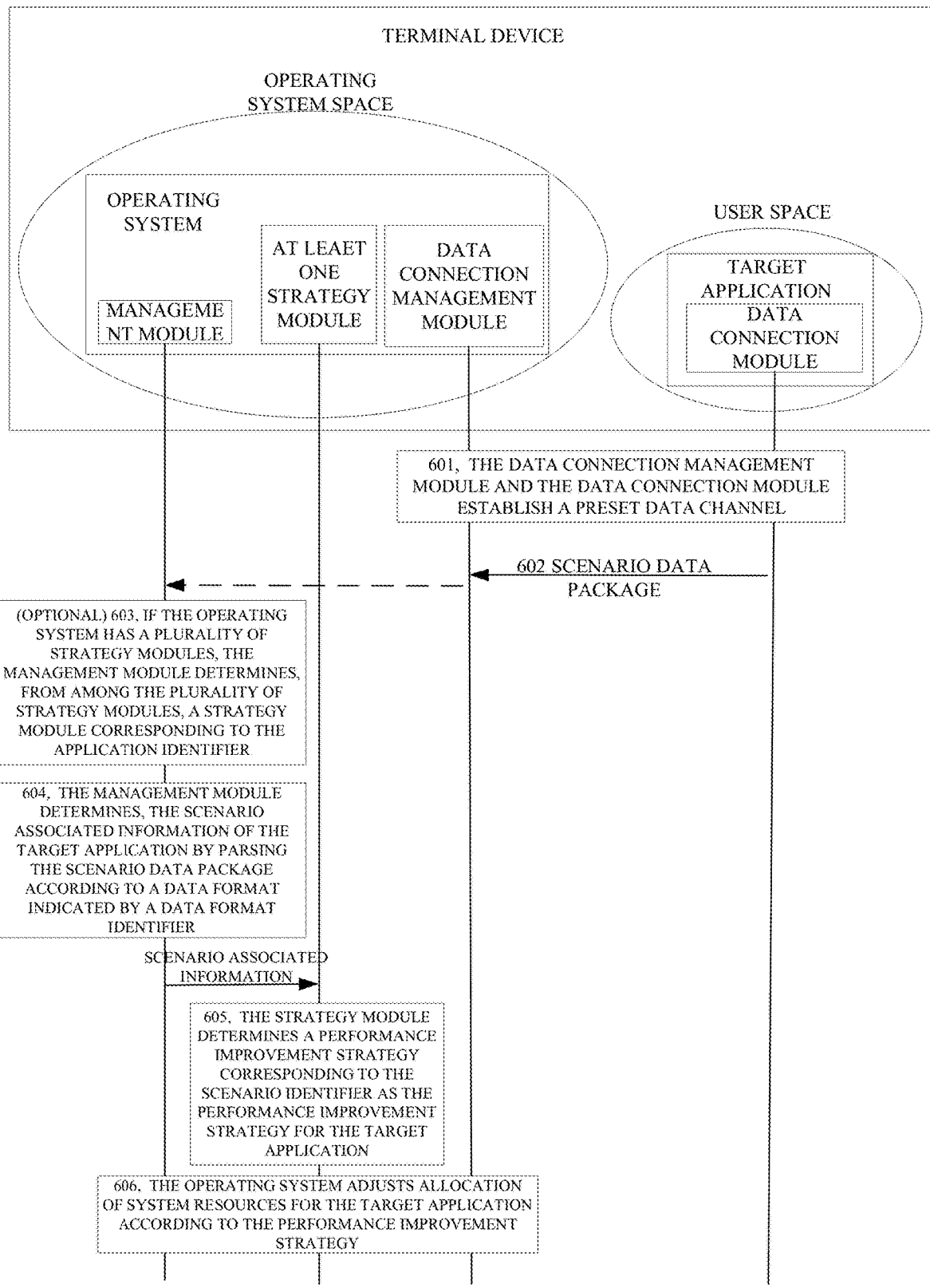
FIG. 6 is a schematic flow chart illustrating a method for resource allocation according to a further implementation of the present application.

FIG. 6 is a schematic flow chart illustrating a method for resource allocation. The method is applicable to a terminal device with a target application and an operating system. The target application runs in a user space of the terminal device. The operating system runs in an operating system space of the terminal device. The operating system has an operating system application. The operating system includes a management module and a plurality of strategy modules. The method begins at block 601.

At block 601, a preset data channel is established by a data connection management module and a data connection module.

At block 602, the data connection management module receives a scenario data package from the target application through the preset data channel.

At block 603, the management module determines, from among the plurality of strategy modules, a strategy module corresponding to an application type identifier obtained by parsing the scenario data package for example. In case that the operating system has only one strategy module, operations at block 603 will be skipped.

At block 604, the management module determines scenario associated information of the target application by parsing the scenario data package according to a data format indicated by the data format identifier and sends the scenario associated information to the strategy module.

The scenario associated information includes a scenario identifier of the target application.

At block 605, the strategy module determines a performance improvement strategy corresponding to the scenario identifier as the performance improvement strategy for the target application.

At block 606, the operating system adjusts allocation of system resources for the target application according to the performance improvement strategy.

According to the implementations of the disclosure, the scenario data package can be transmitted via a preset data channel is established by a data connection management module and a data connection module. With aid of the scenario data package, which contains the scenario data package or contains the scenario data package and the application type identifier, performance improvement strategy for the target application can be determined and subsequently, system resource allocation can be adjusted.

In the foregoing implementations, since scenario identifiers and performance improvement strategies are in one-to-one correspondence and the scenario identifier of the scenario data package is associated with a current scenario of the target application that is currently running, that is, the performance improvement strategy determined is associated with a current running state of the target application that is currently running, adjusting of resource allocation according to the performance improvement strategy can accurately optimize the current running state of the target application, which is helpful for improving the accuracy of the performance optimization of the terminal device in controlling the target application that is currently running.

In addition, the management module processes the scenario data package in a unified manner, and what the strategy module needs to do is receiving from the management module the processing result, that is, the scenario associated information. With aid of such setting, functions of the strategy module can be optimized and refined, which facilitates maintenance, addition, and other operations performed on the strategy module, therefore improving system stability.

Figure 7:
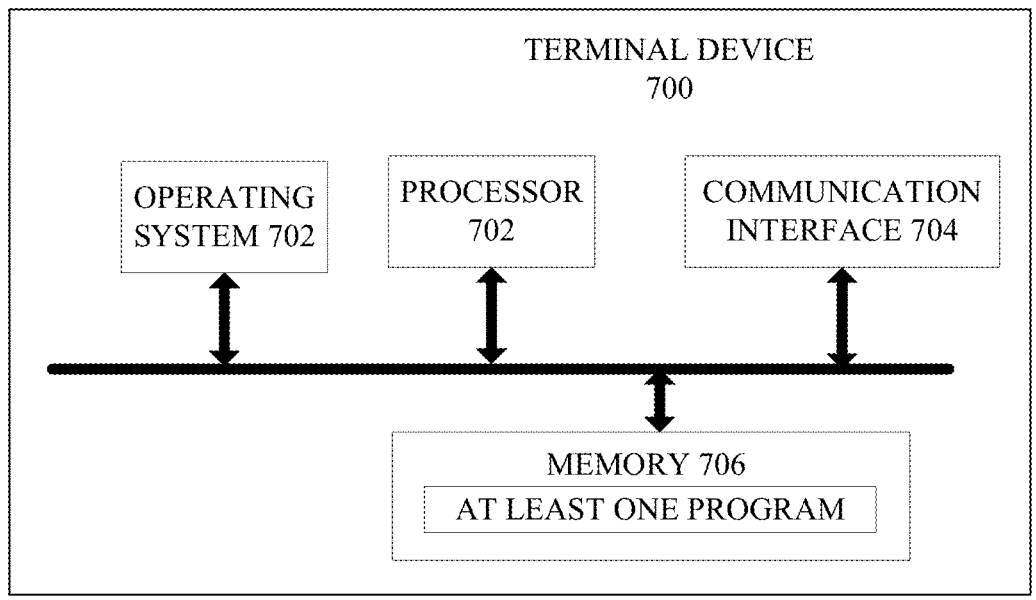
FIG. 7 is a schematic structural diagram illustrating a terminal device according to an implementation of the present application.

FIG. 7 is a schematic structural diagram illustrating a terminal device 700 according to an implementation of the disclosure. The terminal device 700 has at least one application running thereon and an operating system 701. The operating system includes a management module and at least one strategy module. As illustrated in FIG. 7, the terminal device includes a processor 702, a memory 706 for storing at least one program, and a communication interface 704. The at least one program is different from the foregoing at least one application. The at least one program is stored in the memory and configured to be performed by the processor. The at least one program includes instructions being operable to perform the following operations.

The management module of the operating system is controlled (for example, under control of the processor 702) to receive a scenario data package from a target application that is currently running, where the scenario data package contains scenario associated information of the target application. The scenario data package may further contain an application type identifier of the target application.

The strategy module of the operating system is controlled to determine a performance improvement strategy for the target application according to the scenario data package. If the operating system has more than one strategy module, the management module is further controlled to determine, from among the plurality of strategy modules, a strategy module corresponding to the application type identifier.

The operating system is controlled to adjust allocation of system resources for the target application according to the performance improvement strategy.

According to the implementation of the disclosure, the management module of the operating system of the terminal device receives the scenario data package from the target application that is currently running, where the scenario data package contains the scenario associated information of the target application. Thereafter the operating system invokes the strategy module to determine the performance improvement strategy for the target application that is currently running according to the scenario data package. At last, the operating system adjusts the allocation of system resources for the target application according to the performance improvement strategy. Since the scenario data package is sent by the target application that is currently running, the management module of the operating system can precisely determine the performance improvement strategy for the target application that is currently running according to the scenario data package, and the operating system can adjust the allocation of the system resources for the target application in real time according to the performance improvement strategy. Therefore, the real-time performance optimization of the target application under running can be realized by the operating system, which is beneficial to improving the real-time performance and accuracy of the performance optimization of the target application which is conducted under control of the terminal device. Moreover, the plurality of strategy modules can implement precise control for applications of different types. With aid of the technical solutions of the present disclosure, the terminal device has no need to load all strategy modules at the same time and only needs to load the strategy module corresponding to the target application running in the foreground of the terminal device, which helps to reduce resource consumption and improve resource utilization rate and control efficiency.

In one implementation, the scenario data package contains scenario associated information of the target application. In terms of controlling the strategy module to determine the performance improvement strategy for the target application according to the scenario data package, the instructions are operable to carry out the following: controlling the strategy module to acquire the scenario associated information of the scenario data package; controlling the strategy module to determine the performance improvement strategy for the target application according to the scenario associated information.

In one implementation, the scenario associated information includes a scenario identifier of the target application. In terms of controlling the strategy module to determine the performance improvement strategy for the target application according to the scenario associated information, the instructions are operable to carry out the following: controlling the strategy module to determine a performance improvement strategy corresponding to the scenario identifier as the performance improvement strategy for the target application.

In one implementation, the scenario associated information includes key performance parameters of the target application. In terms of controlling the strategy module to determine the performance improvement strategy for the target application according to the scenario associated information, the instructions are operable to carry out the following: controlling the strategy module to determine the performance improvement strategy for the target application according to the key performance parameters.

In one implementation, the scenario associated information includes the scenario identifier and the key performance parameters of the target application. In terms of controlling the strategy module to determine the performance improvement strategy for the target application according to the scenario associated information, the instructions are operable to carry out the following: controlling the strategy module to determine system resources to-be-adjusted corresponding to the scenario identifier; controlling the strategy module to determine the performance improvement strategy for the target application according to the system resources to-be-adjusted and the key performance parameters.

In one implementation, the scenario data package contains a data format identifier. In terms of controlling the strategy module to acquire the scenario associated information of the scenario data package, the instructions are operable to carry out the following: controlling the management module to determine the scenario associated information of the target application by parsing the scenario data package according to a data format indicated by the data format identifier and send the scenario associated information to the strategy module.

Alternatively, in terms of controlling the strategy module to acquire the scenario associated information of the scenario data package, the instructions are operable to carry out the following: controlling the management module to send the scenario data package to the strategy module; controlling the strategy module to determine the scenario associated information of the target application by parsing the scenario data package according to the data format indicated by the data format identifier.

Alternatively, in terms of controlling the strategy module to acquire the scenario associated information of the scenario data package, the instructions are operable to carry out the following: controlling the management module to determine a first data format associated with the strategy module, to convert a second data format of the scenario data package into the first data format when the second data format is different from the first data format, and to send to the strategy module the scenario data package converted; controlling the strategy module to determine the scenario associated information of the target application by parsing the scenario data package converted according to the first data format.

In one implementation, the target application includes a data connection module. The operating system includes a data connection management module. In terms of controlling the operating system to receive the scenario data package from the target application that is currently running, the instructions are operable to perform the following: controlling the data connection management module and the data connection module to establish a preset data channel; controlling the data connection management module to receive the scenario data package from the target application through the preset data channel.

In one possible implementation, the system resources include at least one of CPU resources, GPU resources, memory bandwidth resources, disk resources, and network resources.

The foregoing mainly describes the solutions of the implementations of the present application from the perspective of the implementation process of the method. It can be understood that, in order to achieve the above functions, the terminal device may include hardware structures and/or software modules corresponding to the respective functions. Those skilled in the art should readily recognize that, in combination with the exemplary units and scheme steps or operations described in the implementations provided herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the present disclosure, functional units may be divided for the terminal device according to the foregoing method examples. For example, functional units may be divided according to corresponding functions and two or more functions may be integrated into one processing unit. The above-mentioned integrated unit can be implemented in the form of hardware or software functional units. It should be noted that the division of units in the implementations of the present disclosure is schematic and is merely a logical function division; there may be other division modes in actual implementations.

Figure 8:
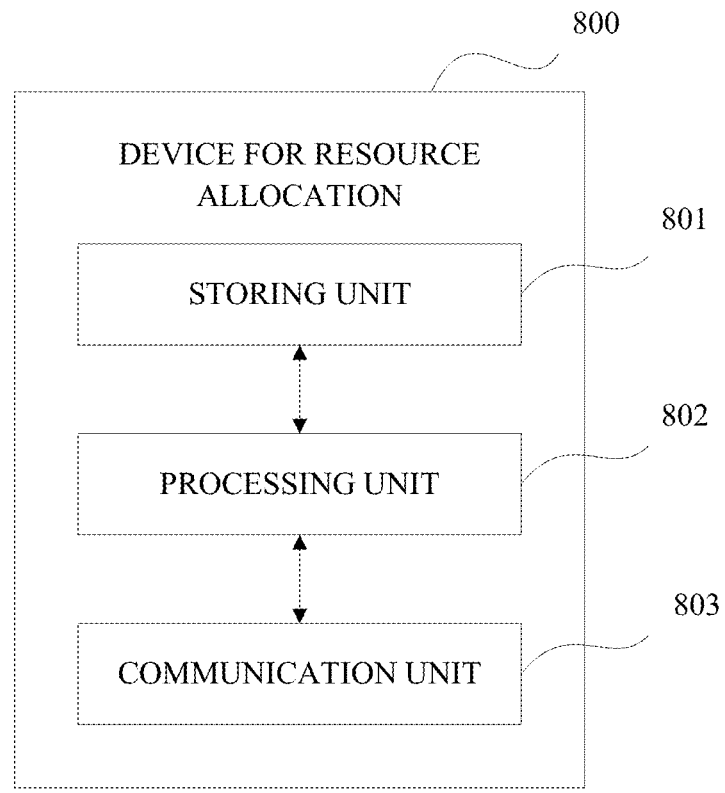
FIG. 8 is a block diagram illustrating functional units of a device for resource allocation according to an implementation of the disclosure.

FIG. 8 is a block diagram illustrating functional units of a device for resource allocation according to an implementation of the disclosure, when integrated units are adopted. A device 800 for resource allocation is applicable to a terminal device with an operating system and at least one application. The operating system includes a management module and a plurality of strategy modules. The device 800 includes a processing unit 802 and a communication unit 803. The processing unit 802 is configured to control and manage operations of the device for resource allocation. For example, the processing unit 802 is configured to support the device for resource allocation to perform operations at blocks 201-203 illustrated in FIG. 2, operations at blocks 301-304 illustrated in FIG. 3, operations at blocks 401-403 illustrated in FIG. 4, operations at blocks 501-505 illustrated in FIG. 5, operations at blocks 601-606 illustrated in FIG. 6, and/or other processes for the techniques described herein. The device 800 may further include a storing unit 801 for storing program codes and data.

The processing unit 802 is configured to: control the management module to receive a scenario data package from a target application that is currently running, through the communication unit 803, where the scenario data package contains scenario associated information of the target application; control the strategy module to determine a performance improvement strategy for the target application according to the scenario associated information of the scenario data package; adjust allocation of system resources for the target application according to the performance improvement strategy.

If the operating system has than one strategy module, the processing unit 802 is further configured to determine, from among the plurality of strategy modules, a strategy module corresponding to an application type identifier contained in the scenario data package.

In one implementation, the processing unit 802 configured to control the strategy module to determine the performance improvement strategy for the target application according to the scenario data package is configured to: control the strategy module to acquire the scenario associated information of the scenario data package; control the strategy module to determine the performance improvement strategy for the target application according to the scenario associated information.

In one implementation, the scenario associated information includes a scenario identifier of the target application. The processing unit 802 configured to control the strategy module to determine the performance improvement strategy for the target application according to the scenario associated information is configured to: control the strategy module to determine a performance improvement strategy corresponding to the scenario identifier as the performance improvement strategy for the target application.

In one implementation, the scenario associated information includes key performance parameters of the target application. The processing unit 802 configured to control the strategy module to determine the performance improvement strategy for the target application according to the scenario associated information is configured to: control the strategy module to determine the performance improvement strategy for the target application according to the key performance parameters.

In one implementation, the scenario associated information includes the scenario identifier and the key performance parameters of the target application. The processing unit 802 configured to control the strategy module to determine the performance improvement strategy for the target application according to the scenario associated information is configured to control the strategy module to: determine system resources to-be-adjusted corresponding to the scenario identifier; determine the performance improvement strategy for the target application according to the system resources to-be-adjusted and the key performance parameters.

In one implementation, the scenario data package contains a data format identifier. The processing unit 802 configured to control the strategy module to acquire the scenario associated information of the scenario data package is configured to control the management module to: determine the scenario associated information of the target application by parsing the scenario data package according to a data format indicated by the data format identifier; send the scenario associated information to the strategy module.

Alternatively, the processing unit 802 configured to control the strategy module to acquire the scenario associated information of the scenario data package is configured to: control the management module to send the scenario data package to the strategy module; control the strategy module to determine the scenario associated information of the target application by parsing the scenario data package according to the data format indicated by the data format identifier.

Alternatively, the processing unit 802 configured to control the strategy module to acquire the scenario associated information of the scenario data package is configured to: control the management module to determine a first data format associated with the strategy module, to convert a second data format of the scenario data package into the first data format when the second data format is different from the first data format, and to send to the strategy module the scenario data package converted; control the strategy module to determine the scenario associated information of the target application by parsing the scenario data package converted according to the first data format.

In one implementation, a preset data channel is established between the target application and the operating system. The processing unit 802 configured to receive the scenario data package from the target application that is currently running through the communication unit 803 is configured to: receive the scenario data package from the target application that is currently running, through the communication unit 803 and via the preset data channel.

In one implementation, the target application includes a data connection module. The operating system includes a data connection management module. The device further includes a channel establishment unit. The channel establishment unit is configured to control the data connection management module and the data connection module to establish the preset data channel.

In one implementation, the system resources include at least one kind of resources of the terminal device: CPU resources, GPU resources, memory bandwidth resources, disk resources, and network resources. The network resources include network resources of the data network of the terminal device, network resources of the wireless fidelity (Wi-Fi) network, and control parameter resources of the Bluetooth module.

The processing unit 802 may be a processor or a controller. The communication unit 703 may be an internal communication interface between the processor and the program space, such as a communication interface between the processor and the operating system or a communication interface between the processor and the user space. The storing unit 801 may be a memory.

Figure 9:
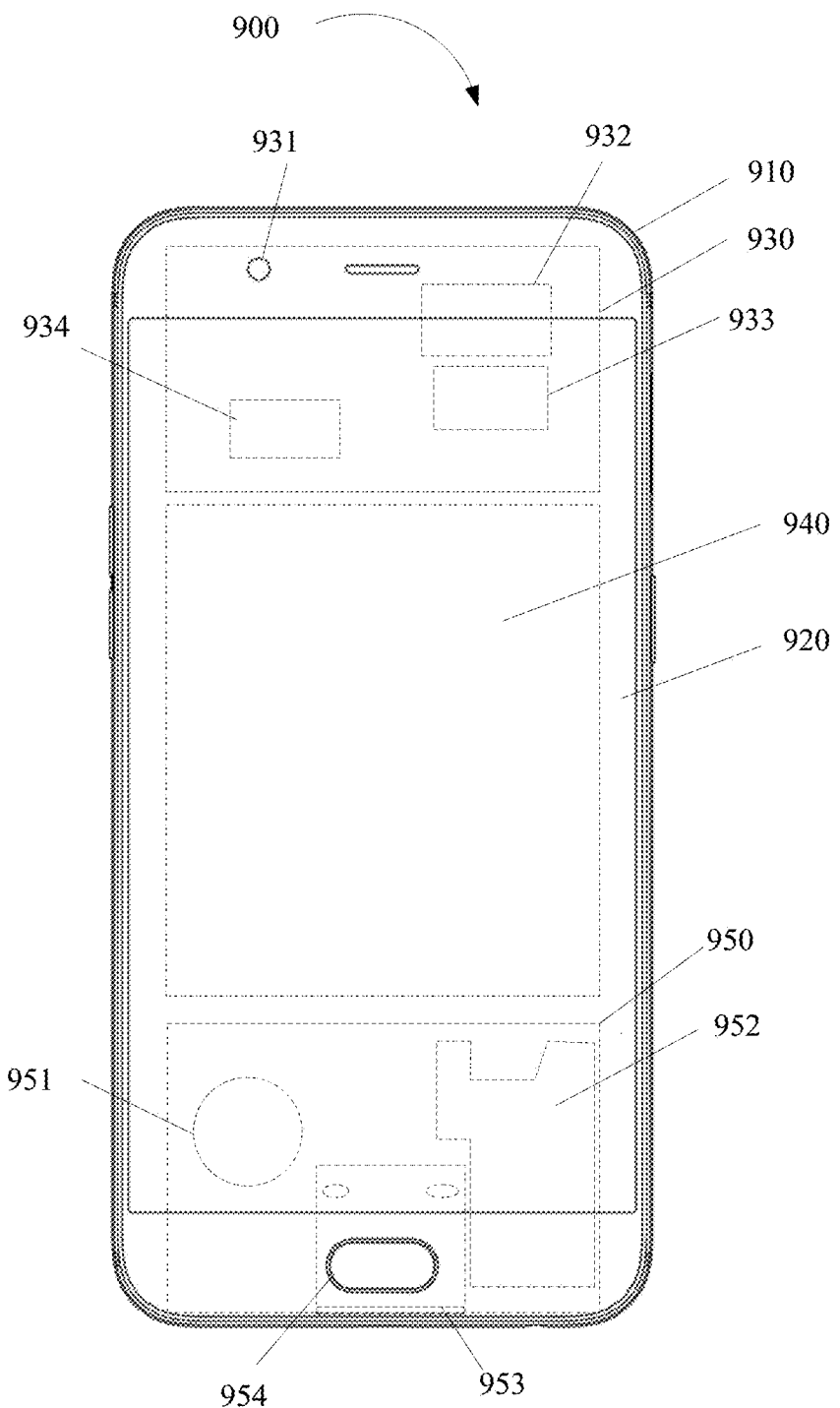
FIG. 9 is a schematic structural diagram illustrating a smart phone according to an implementation of the disclosure.

Referring to FIG. 9, FIG. 9 is a schematic structural diagram illustrating a smart phone 900 according to an implementation of the disclosure. The smart phone 900 includes a housing 910, a touch display screen 920, a main board 930, a battery 940, and a sub-board 950. The main board 930 is provided with a front camera 931, a processor 932, a memory 933, and a power management chip 934. The sub-board 950 is provided with a vibrator 951, an integrated audio cavity 952, a VOOC flash charging interface 953, and a fingerprint recognition module 954.

The smart phone has an operating system and at least one application. The target application runs in a user space, and the operating system runs in an operating system space. The operating system is configured to receive a scenario data package from the target application that is currently running. The operating system is configured to determine a performance improvement strategy for the target application according to the scenario data package. The operating system is further configured to adjust allocation of system resources for the target application that is currently running according to the performance improvement strategy.

The processor 932 is a control center of the mobile phone. The processor 932 is configured to connect various parts of the entire smart phone through various interfaces and lines, run or execute software programs and/or modules stored in the memory 933, and invoke data stored in the memory 933, to execute various functions of the smart phone and process data, thereby monitoring the smart phone as a whole. In at least one implementation, the processor 932 may include at least one processing unit. For example, the processor 932 can be integrated with an application processor and a modem processor, where the application processor is mainly configured to handle and maintain an operating system, a user interface, applications, and so on. The modem processor is mainly configured to process wireless communication. It will be appreciated that the above-mentioned modem processor mentioned above may not be integrated into the processor 932. The processor 932 may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and a microprocessor, and the like.

The memory 933 is configured to store software programs and modules. The processor 932 is configured to execute various function applications and data processing of the smart phone by running the software programs and the modules stored in the memory 933. The memory 933 may mainly include a program storage area and a data storage area. The program storage area may store an operating system, applications required for at least one function, and the like. The data storage area may store data created according to the use of the smart phone, and the like. In addition, the memory 933 may include a high-speed random access memory (RAM), and may further include a non-transitory memory such as at least one disk storage device, a flash device, or other non-transitory solid storage devices. The memory 933 may be, for example, a RAM, a flash memory, a read only memory (ROM), an erasable programmable ROM (EPROM), or an electrically EPROM (EEPROM), a register, a hard disk, a mobile hard disk, a compact disc-read only memory (CD-ROMs), or any other form of storage medium known in the art.

Implementations of the present disclosure also provide a non-transitory computer storage medium. The computer storage medium stores computer programs which, when executed, are operable with a computer to perform all or part of the operations of any of the methods described in the above-described method implementations. The computer may include a terminal device.

In one implementation, the computer programs cause the computer to perform the following operations. An operating system receives a scenario data package from a target application that is currently running. The operating system determines a performance improvement strategy for the target application according to the scenario associated information. The operating system adjusts allocation of system resources for the target application according to the performance improvement strategy.

The scenario data package contains scenario associated information of the target application, the scenario associated information includes at least one of a scenario identifier and key performance parameters. The operating system includes one management module and at least one strategy module, one of which is configured or determined to determine the performance improvement strategy.

The scenario data package may further include application type identifier, with which one strategy module can be determined from multiple strategy modules to determine a specific performance improvement strategy.

Implementations of the present disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package. The computer may include a terminal device.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product.

Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a mobile hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource allocation, comprising:
receiving, by a management module of an operating system, a scenario data package from a target application that is currently running, the scenario data package comprising scenario associated information of the target application;
determining, by a strategy module of the operating system, a performance improvement strategy for the target application according to the scenario data package; and
adjusting, by the operating system, allocation of system resources for the target application according to the performance improvement strategy,
wherein determining the performance improvement strategy for the target application according to the scenario data package comprises:
acquiring, by the strategy module, the scenario associated information from the scenario data package; and
determining, by the strategy module, the performance improvement strategy for the target application according to the scenario associated information;
wherein the scenario associated information comprises key performance parameters of the target application, and determining the performance improvement strategy for the target application according to the scenario associated information comprises:
determining, by the strategy module, parameter types and a parameter numerical range of the key performance parameters;
determining, by the strategy module, a performance improvement strategy package corresponding to the parameter types, wherein the performance improvement strategy package contains a plurality of performance improvement strategies suitable for different parameter numerical ranges; and
determining, by the strategy module, from the plurality of performance improvement strategies, a performance improvement strategy suitable for the parameter numerical range of the key performance parameters.

2. The method of claim 1, wherein the operating system comprises more than one strategy module, and each strategy module is configured to determine a performance improvement strategy for at least one application of a same application type.

3. The method of claim 2, wherein the scenario data package further comprises an application type identifier of the target application, and the method further comprises:
prior to determining the performance improvement strategy for the target application according to the scenario data package:
acquiring, by the management module, the application type identifier from the scenario data package; and
determining, by the management module from the more than one strategy module, a strategy module corresponding to the application type identifier as the strategy module for determining the performance improvement strategy for the target application.

4. The method of claim 3, wherein determining, by the management module from the more than one strategy module, the strategy module corresponding to the application type identifier comprises:
determining, by the management module from the more than one strategy module, the strategy module corresponding to the application type identifier by querying a mapping relation between preset strategy modules and application type identifiers with the application type identifier as a query identifier.

5. The method of claim 1, wherein the operating system comprises one strategy module.

6. The method of claim 1, wherein receiving the scenario data package from the target application that is currently running comprises:
receiving, by the management module, the scenario data package from the target application that is currently running through a preset data channel established between the target application and the operating system.

7. A terminal device, comprising:
at least one processor; and
a non-transitory computer readable storage medium, coupled to the at least one processor and storing at least one computer executable instruction thereon which, when executed by the at least one processor, causes the at least one processor to:
receive, by a management module of an operating system, a scenario data package from a target application that is currently running, the scenario data package comprising scenario associated information of the target application;
determine, by a strategy module of the operating system, a performance improvement strategy for the target application according to the scenario data package; and
adjust, by the operating system, allocation of system resources for the target application according to the performance improvement strategy,
wherein the at least one computer executable instruction causing the at least one processor to determine the performance improvement strategy for the target application according to the scenario data package further causes the at least one processor to:
acquire, by the strategy module, the scenario associated information from the scenario data package; and determine, by the strategy module, the performance improvement strategy for the target application according to the scenario associated information;
wherein the scenario associated information comprises key performance parameters of the target application, and the at least one computer executable instruction causing the at least one processor to determine the performance improvement strategy for the target application according to the scenario associated information further causes the at least one processor to:
determine, by the strategy module, parameter types and a parameter numerical range of the key performance parameters;
determine, by the strategy module, a performance improvement strategy package corresponding to the parameter types, wherein the performance improvement strategy package contains a plurality of performance improvement strategies suitable for different parameter numerical ranges; and
determine, by the strategy module, from the plurality of performance improvement strategies, a performance improvement strategy suitable for the parameter numerical range of the key performance parameters.

8. The terminal device of claim 7, wherein the operating system comprises more than one strategy module and each strategy module is configured to determine a performance improvement strategy for at least one application of a same application type,
the scenario data package further comprises an application type identifier of the target application, and
the at least one computer executable instruction causing the at least one processor to determine the performance improvement strategy for the target application according to the scenario data package further causes the at least one processor to:
acquire, by the management module, the application type identifier from the scenario data package; and
determine, by the management module, from the more than one strategy module, a strategy module corresponding to the application type identifier as the strategy module for determining the performance improvement strategy for the target application.

9. A non-transitory computer readable storage medium, storing at least one computer executable instruction thereon, which, when executed by a data-processing apparatus, is adapted to:

receive, by an operating system, a scenario data package from a target application that is currently running, the scenario data package comprising scenario associated information of the target application;
determine, by the operating system, a performance improvement strategy for the target application according to scenario associated information; and
adjust, by the operating system, allocation of system resources for the target application according to the performance improvement strategy,
wherein the at least one computer executable instruction, which, when executed by the data-processing apparatus, adapted to determine the performance improvement strategy for the target application according to the scenario data package is adapted to:
acquire, by the strategy module, the scenario associated information from the scenario data package; and
determine, by the strategy module, the performance improvement strategy for the target application according to the scenario associated information;
wherein the scenario associated information comprises key performance parameters of the target application, and the at least one computer executable instruction, which, when executed by the data-processing apparatus, adapted to determine the performance improvement strategy for the target application according to the scenario associated information is adapted to:
determine, by the strategy module, parameter types and a parameter numerical range of the key performance parameters;
determine, by the strategy module, a performance improvement strategy package corresponding to the parameter types, wherein the performance improvement strategy package contains a plurality of performance improvement strategies suitable for different parameter numerical ranges; and
determine, by the strategy module, from the plurality of performance improvement strategies, a performance improvement strategy suitable for the parameter numerical range of the key performance parameters.

10. The non-transitory computer readable storage medium of claim 9, wherein the operating system comprises a management module for the receiving and at least one strategy module.

* * * * *